(12) United States Patent
Lin

(10) Patent No.: US 10,258,150 B2
(45) Date of Patent: Apr. 16, 2019

(54) HEIGHT ADJUSTABLE DESK

(71) Applicants: Yi-Chen Tseng, Taichung (TW); HI-MAX INNOVATION CO., LTD., Taichung (TW)

(72) Inventor: Jhih-Fan Lin, Taichung (TW)

(73) Assignees: Yi-Cheng Tseng, Taichung (TW); Hi-Max Innovation Co., Ltd., Taichung (TW)

(*) Notice: Subject to any disclaimer, the term of this patent is extended or adjusted under 35 U.S.C. 154(b) by 0 days.

(21) Appl. No.: 15/906,805

(22) Filed: Feb. 27, 2018

(65) Prior Publication Data

US 2018/0184799 A1    Jul. 5, 2018

Related U.S. Application Data

(63) Continuation-in-part of application No. 15/391,109, filed on Dec. 27, 2016.

(51) Int. Cl.
*A47B 17/02* (2006.01)
*A47B 13/02* (2006.01)
*A47B 9/04* (2006.01)

(52) U.S. Cl.
CPC .............. *A47B 17/02* (2013.01); *A47B 9/04* (2013.01); *A47B 13/02* (2013.01); *A47B 2200/0052* (2013.01); *A47B 2200/0058* (2013.01); *A47B 2200/0059* (2013.01); *A47B 2200/0061* (2013.01); *A47B 2200/0062* (2013.01)

(58) Field of Classification Search
CPC ..... A47B 9/04; A47B 9/20; A47B 2200/0057; A47B 2200/0056; A47B 2200/0062

USPC .................................................. 108/20, 147
See application file for complete search history.

(56) References Cited

U.S. PATENT DOCUMENTS

| | | | | |
|---|---|---|---|---|
| 5,224,429 A | * | 7/1993 | Borgman .................. | A47B 9/00 108/147 |
| 5,467,720 A | * | 11/1995 | Korenaga ............. | G03F 7/2039 108/147 |
| 6,352,037 B1 | * | 3/2002 | Doyle ....................... | A47B 9/00 108/147 |
| 7,163,184 B2 | * | 1/2007 | Nielsen .................... | A47B 9/12 108/147 |
| 8,240,257 B2 | * | 8/2012 | Frost ...................... | A47B 13/00 108/147 |
| 8,505,137 B1 | * | 8/2013 | Gaines, Jr. ........... | A61B 6/0457 108/147 |
| 9,038,549 B1 | * | 5/2015 | Zebarjad .................. | A47B 9/02 108/147 |

(Continued)

*Primary Examiner* — Jose V Chen
(74) *Attorney, Agent, or Firm* — Wang Law Firm, Inc.

(57) ABSTRACT

A height adjustable desk includes a worksurface, a first leg and a second leg connected to the worksurface. The first leg is provided with a first motor to drive a first lifting apparatus for telescoping the first leg, while the second leg is provided with a second motor to drive a second lifting apparatus for telescoping the second leg. Each of the first motor and the second motor is provided with a magnetic device and two sensors. The magnetic device has several N-pole sections and S-pole sections, and the sensor detect a change of a magnetic field when the motor is turning. A control unit receives the signals of the sensor, and changes a speed of at least one of the motors until the signals are synchronous again when the control unit found that the signals are not synchronous.

15 Claims, 12 Drawing Sheets

(56) References Cited

U.S. PATENT DOCUMENTS

| | | | | |
|---|---|---|---|---|
| 2006/0279143 | A1* | 12/2006 | Platz | A47B 9/04 |
| | | | | 310/51 |
| 2012/0068635 | A1* | 3/2012 | Koch | A47B 9/04 |
| | | | | 318/135 |
| 2012/0126072 | A1* | 5/2012 | Pettersson | A47B 9/04 |
| | | | | 248/157 |
| 2012/0304897 | A1* | 12/2012 | Williamson | A47B 3/00 |
| | | | | 108/50.11 |
| 2017/0340103 | A1* | 11/2017 | Happich | A47B 9/04 |
| 2018/0177288 | A1* | 6/2018 | Lin | A47B 9/04 |

* cited by examiner

HEIGHT ADJUSTABLE DESK

CROSS REFERENCE TO RELATED APPLICATIONS

This application is a Continuation-In-Part of U.S. patent application Ser. No. 15/391,109, filed Dec. 27, 2016, the entire disclosures of which is incorporated by reference herein for all purposes.

BACKGROUND OF THE INVENTION

1. Technical Field

The present invention relates to a desk, and more particularly to a height adjustable desk.

2. Description of Related Art

According to ergonomic guideline of work place design, a height of a work surface should be influenced in part by the nature task. In the research of Ward and Kirk (1970), the tasks are classified into three type, light work, precision work and heavy work. The work-surface height for the light work should be equal to an elbow height of the worker. The work-surface height for the precision work should be higher than elbow height, and the work-surface height for the heavy work should be higher than elbow height. However, the heights of the works are different, so that the work-surface height should be adjustable according to the work's body scale to let him/her have a safe work place and an efficient performance.

A conventional height adjustable desk has a worksurface and a plurality of adjustable legs connected to a bottom of the worksurface. Each of the adjustable legs includes an upper tube connected to the worksurface and a lower tube fitted to the upper tube. The upper tube is provided with a plurality of bores, and the lower tube is provided with a bore. The upper tube is movable relative to the lower tube, and one of the bores of the upper tube is aligned with the bore of the lower tube for a pin inserted into both bores of the lower tube and the upper tube to fix them. Such desk only provides a few of heights to be adjusted that could not fit all the workers with various heights.

BRIEF SUMMARY OF THE INVENTION

In view of the above, the primary objective of the present invention is to provide a height adjustable desk, which provides a continuous adjustment of height.

The secondary objective of the present invention is to provide a height adjustable desk, which makes sure of both legs being telescoped synchronously.

In order to achieve the objective of the present invention, a height adjustable desk includes a worksurface; a first leg and a second leg connected to a bottom of the worksurface; a first motor and a first lifting apparatus provided in the first leg, wherein the first motor drives the first lifting apparatus to telescope the first leg; a second motor and a second lifting apparatus provided in the second leg, wherein the second motor drives the second lifting apparatus to telescope the second leg; a first magnetic device connected to a shaft of the first motor to be turned with the first motor, wherein the first magnetic device has a plurality of N-pole sections and a plurality of S-pole sections alternately arranged in an annular pattern; a first front sensor and a first rear sensor provided in the first leg and adjacent to the first magnetic device to detect a change of a magnetic field when the first magnetic device is turning; a second magnetic device connected to a shaft of the second motor to be turned with the second motor, wherein the second magnetic device has a plurality of N-pole sections and a plurality of S-pole sections alternately arranged in an annular pattern; a second front sensor and a second rear sensor provided in the second leg and adjacent to the second magnetic device to detect a change of a magnetic field when the second magnetic device is turning; and a control unit receiving signals from the first front sensor, the first rear sensor, the second front sensor, and the second rear sensor.

When the signals of the first front sensor and the first rear sensor and the signals of the second front sensor and the second rear sensor are not synchronous, the control unit controls at least one of the first motor and the second motor to change a speed thereof until the signals of the first front sensor and the first rear sensor and the signals of the second front sensor and the second rear sensor are synchronous again.

The present invention further provides a method of keeping two motors synchronously turning, including:

A. Provide a first magnetic device on a shaft of a first motor and a second magnetic device on a shaft of a second motor, wherein each of the first and the second magnetic device have a plurality of N-pole sections and a plurality of S-pole sections alternately arranged in an annular pattern.

B. Provide a first front sensor and a first rear sensor to sense a change of a magnetic field of the first magnetic device when the first motor is turning, and providing a second front sensor and a second rear sensor to sensing a change of a magnetic field of the second magnetic device when the second motor is turning, wherein there is a phase difference between signals of the first front sensor and the first rear sensor, and there is a phase difference between signals of the second front sensor and the second rear sensor.

C. Combine the signals of the first front sensor and the first rear sensor to obtain first combinative signals, and combining the signals of the second front sensor and the second rear sensor to obtain second combinative signals; and D. Compare the first combinative signals with the second combinative signals, and when the first combinative signals and the second combinative signals are not synchronous, changing a speed of at least one of the first motor and of the second motor until the first combinative signals and the second combinative signals are synchronous again.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
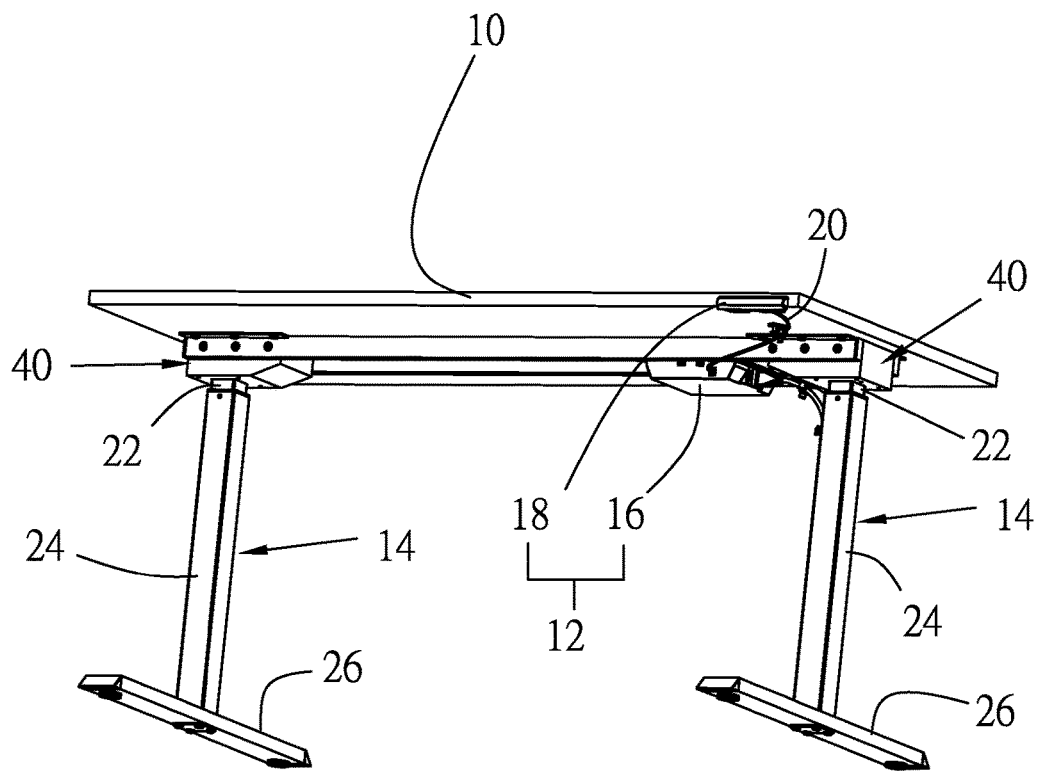
FIG. 1 is a perspective view of a first preferred embodiment of the present invention.

FIG. 1 shows a height adjustable desk of the first preferred embodiment of the present invention includes a worksurface 10, a control module 12, and two leg modules 14.

The worksurface 10 is a rectangular board, on a bottom side of which the control module 12 and the leg modules 14 are provided.

The control module 12 includes a control box 16 and a control panel 18. The control box 16 is fixed to the bottom of the worksurface 10, in which a control unit (not shown) and a power (not shown) are provided. The panel 18 is fixed to an edge of the worksurface 10, and electrically connected to the control unit through a wire 20. The panel 18 has a plurality of keys for user to operate to control the leg modules 14.

Figure 2:
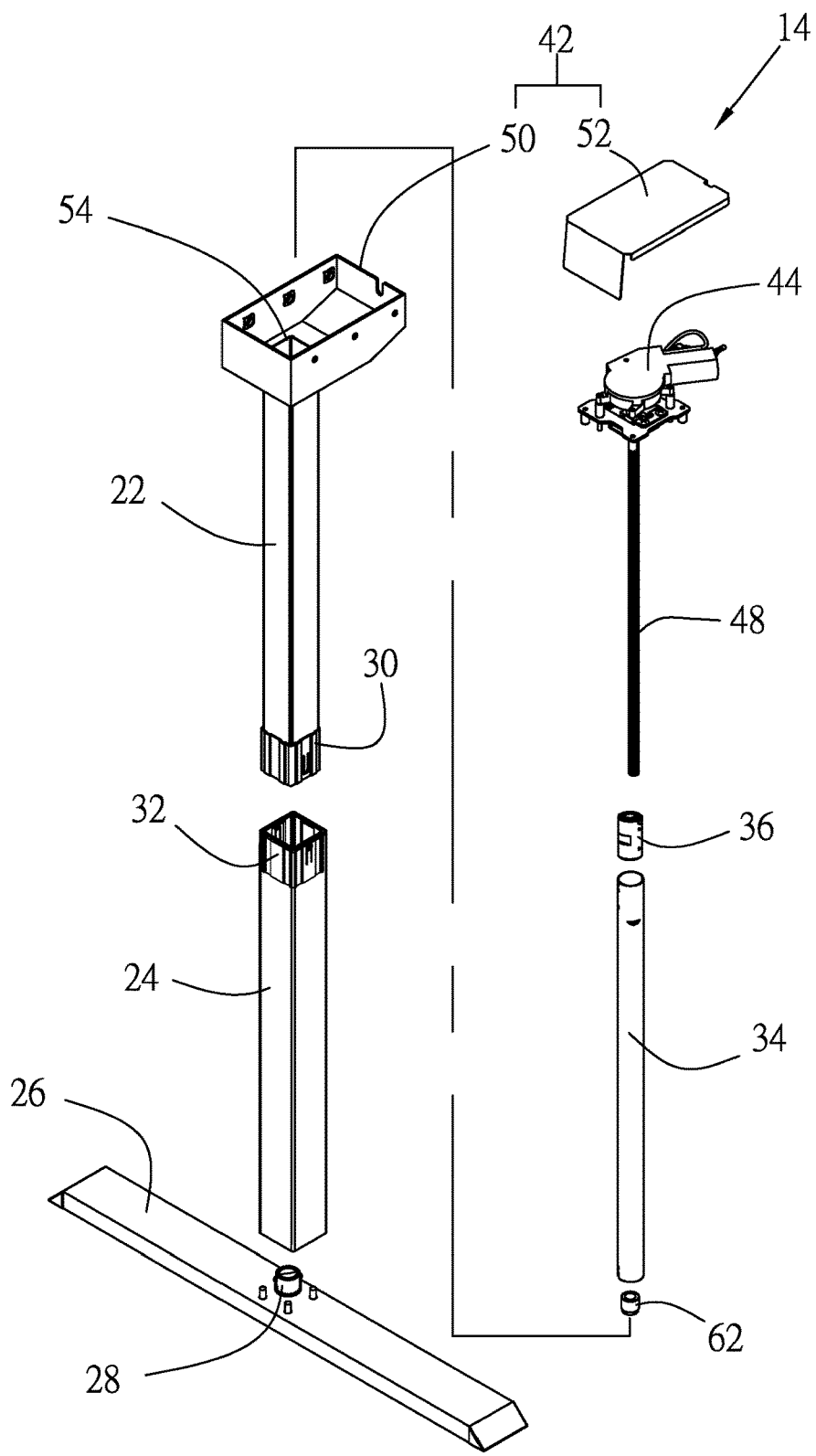
FIG. 2 is an exploded view of the leg module of the first preferred embodiment of the present invention.
Figure 3:
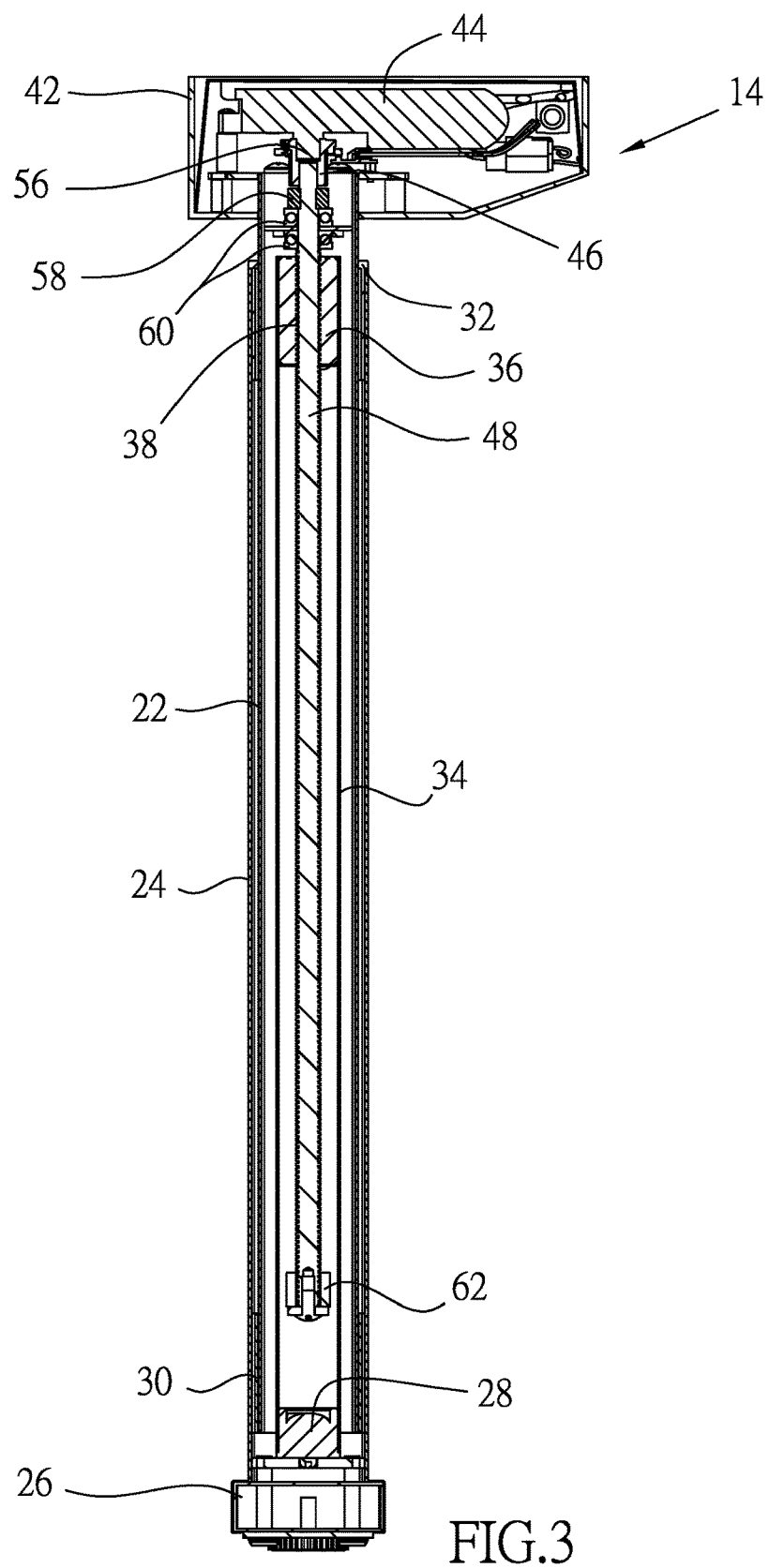
FIG. 3 is a sectional view of the leg module of the first preferred embodiment of the present invention, showing the first leg member be lowered.

As shown in FIGS. 2 and 3, each of the leg modules 14 includes a first leg member 22, a second leg member 24, a stand 26, and a driving device 40. The first and the second leg members 22, 24 are rectangular tubular bars, and the first leg member 22 is inserted into the second leg member 24 for a reciprocation relative to the second leg member 24. The stand 26 is horizontally connected to a bottom end of the second leg member 24 to let the leg module 14 stably stand on the ground. The stand 26 is provided with a holder 28 located in the second leg member 24. The first leg member 22 is provided with a stopper 30 on an outer side and closed to a bottom end (the end inserted into the second leg member 24), and the second leg member 24 is provided with a stopper 32, which is inserted into the second leg member 24 via a top end (the end of the first leg member 22 inserted) and stopped at the top end. The stoppers 30, 32 abutted against each other while the first leg member 22 is lifted for a predetermined distance to limit the worksurface 10 with a maximum height. The second leg member 24 is received with an inner tube 34. The inner tube 34 has an end fixed to the holder 28 of the stand 26, so that the inner tube 34 is fixed to the second leg member 24 as well. A block 36 with a threaded hole 38 is fixed in the inner tube 34.

Figure 4:
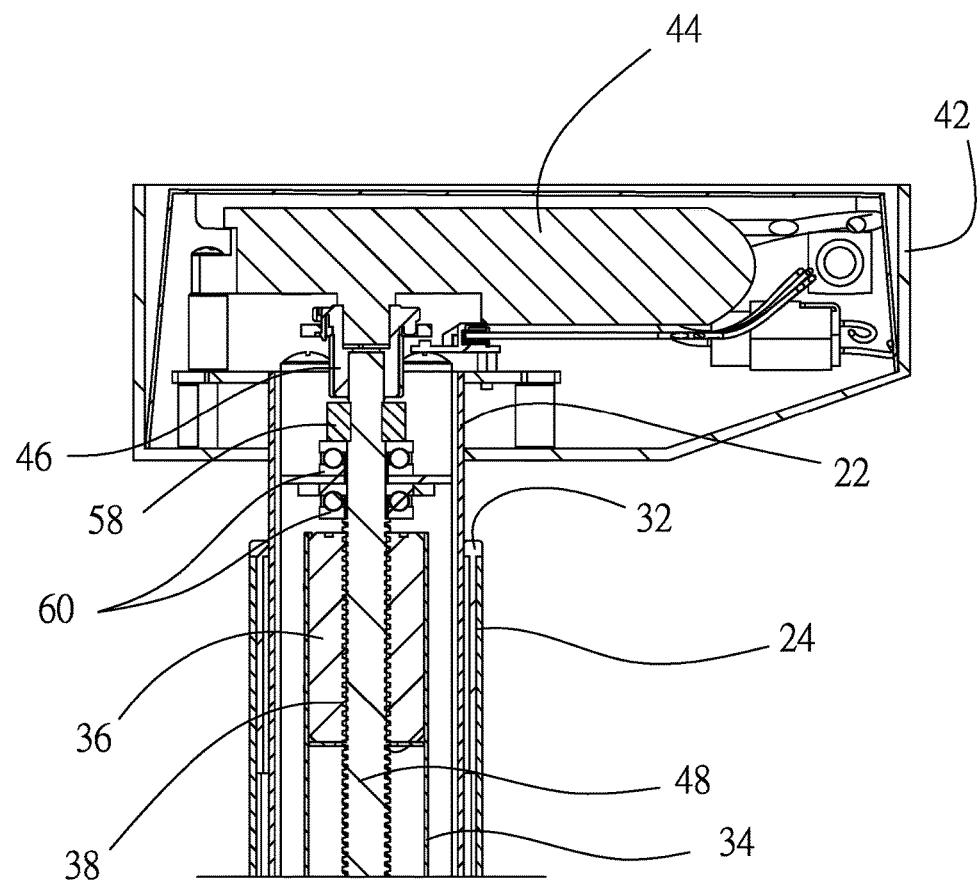
FIG. 4 is a sectional view of the leg module of the first preferred embodiment of the present invention, showing the detail of the driving device.

As shown in FIG. 4, the driving device 40 includes a case 42, in which a motor 44, a sensor 46, and a screw rod 48. The case 42 is fixed to the bottom of the worksurface 10. The case 42 has a box 50 and a lid 52 connected to a top of the box 50, and the box 50 has an opening 54 on a bottom thereof. The first leg member 22 has an end connected to the opening 54 of the box 50, so that the case 42 is communicated with the first leg member 22. The motor 44 is fixed in the case 42, and electrically connected to the control unit 78 to be driven to rotate according to a command from the control unit 78. The motor 44 has a spindle 56 connected to the sensor 46 to rotate together with the spindle 56. In the present preferred embodiment, the sensor 46 is a Hall effect sensor that varies its output voltage in response to a magnetic field to detect a number of turns of the spindle 56. The sensor 46 is electrically connected to the control unit 78, and sends it a signal of the number of turns. In another embodiment, the sensor 46 could be any suitable sensor for sensing the rotation of the motor 44, such as optical gate sensor and infrared rays sensor. The screw rod 48 has an end connected to the sensor 46, so that the screw rod 48 is driven by the motor 44. A space ring 58 and two thrust bearings 60 are provided onto the screw rod 48. The thrust bearings 60 are between the first leg member 22 and the screw rod 48. The screw rod 48 is screwed into the threaded hole 38 of the block 36, and received in the inner tube 34. A weight member 62 is fixed to a distal end of the screw rod 48. Since the screw rod 48 is suspended in the inner tube 34, the weight member 62 is helpful to a stable rotation of the screw rod 48.

Figure 5:
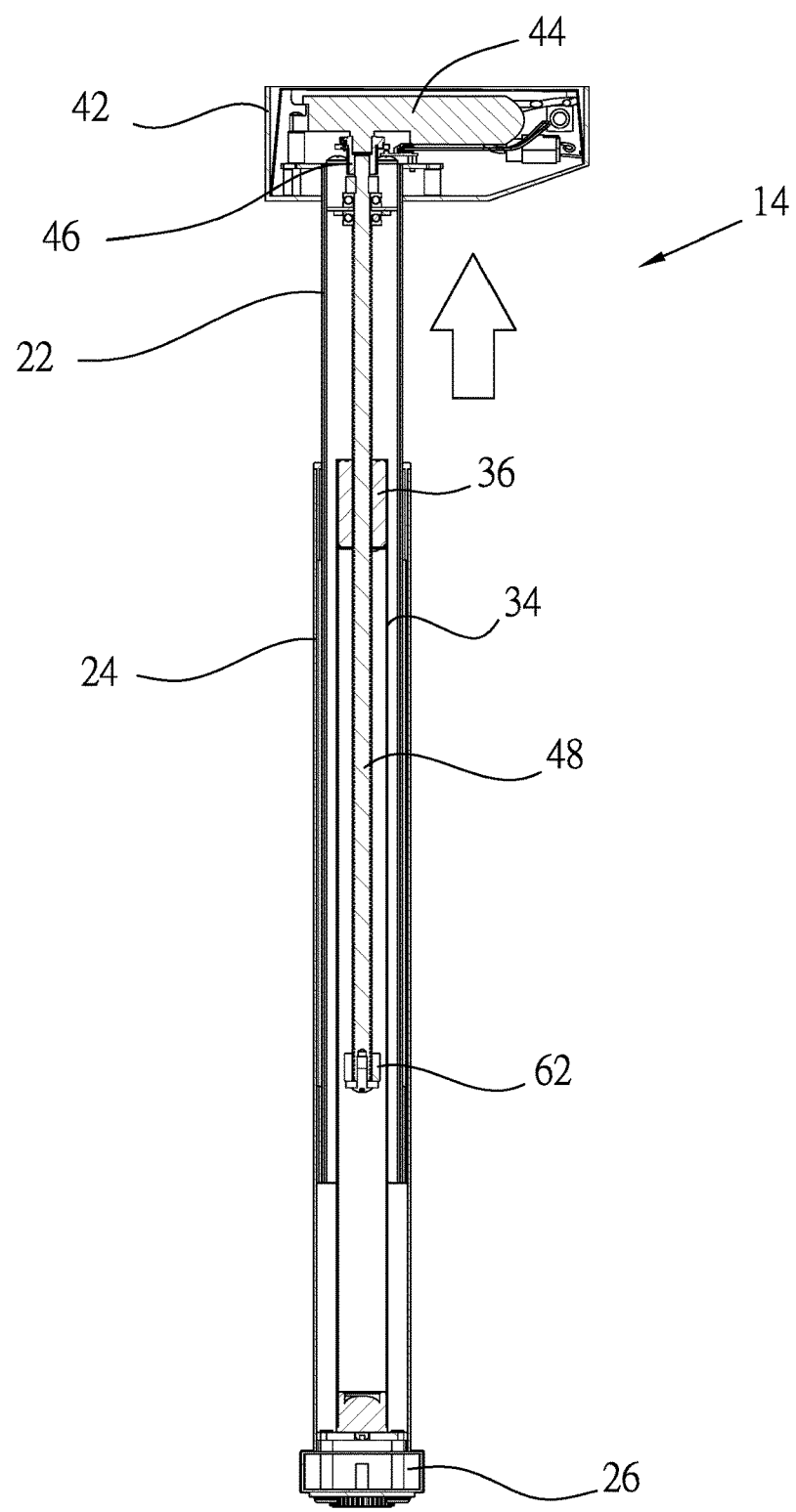
FIG. 5 is a sectional view of the leg module of the first preferred embodiment of the present invention, showing the first leg member be lifted.

When a user operates the control panel 18, and control unit 78 drives the motor 44 to rotate accordingly, and the screw rod 48 is rotated at the same time. Since the block 36 is fixed to the second leg member 24 through the inner tube 34 and the stand 26, the first leg member 22 will be reciprocated relative to the second leg member 24 when the motor 44 is started. As a result, the worksurface 10 lifted (FIG. 5) or lowered (FIG. 3) according to the operation of the user.

Figure 6:
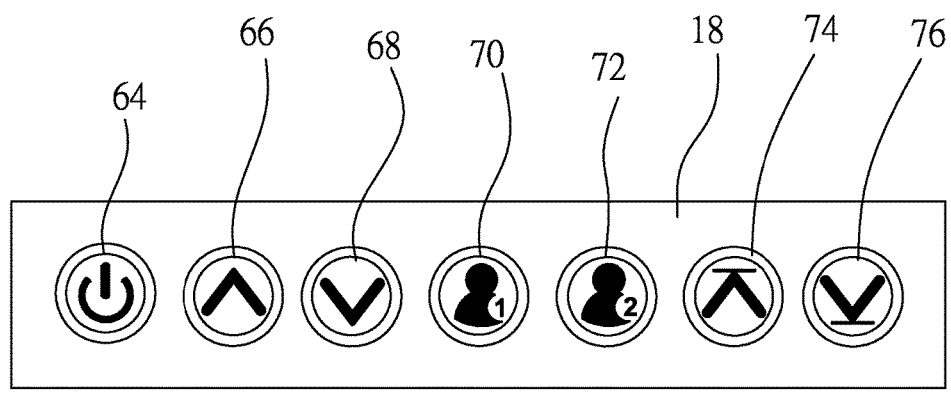
FIG. 6 is a front view of the control panel of the first preferred embodiment of the present invention.

In the present preferred embodiment, as shown in FIG. 6, the control panel 18 is provided with a power key 64, a lift key 66, a lower key 68, two memory keys 70, 72, a highest key 74, and a lowest key 76. When a user presses the lift key 66, the motor 44 drives the screw rod 48 to rotate in a direction to lift the worksurface 10 until the user releases the lift key 66. Similarly, the user pressing the lower key 68 will drive screw rod 48 to rotate in an opposite direction to lower the worksurface 10 until the user releases the lower key 68. When a user adjusts the worksurface 10 to a desired height, he/she can press the first memory key 70 for a predetermined time (three seconds for example), and the control unit 78 will store the current height in a memory thereof as a first setting height. Therefore, the worksurface 10 will be adjusted to the first setting height when the user presses the first memory key 70. The control panel 18 provides two memory keys 70, 72 which means that two setting heights could be stored. The worksurface 10 will be lifted to a highest position when the user presses the highest key 74, and lowered to a lowest position when the user presses the lowest key 76. It is noted that the sensor 46 serves the key function of the adjustment of the worksurface 10 to the setting heights. The number of turns of the motor 44 sensed by the sensor 46 is sent to the control unit 78 and memorized to acknowledge a current height of the worksurface 10. The current height is compared with the setting height to control the motor 44 accordingly. In another preferred embodiment, the control panel 18 is provided with a plurality of height keys (not shown) instead of the memory keys. The manufacturer pre-sets some set heights of the worksurface 10 to the height keys, so that the worksurface 10 could be adjusted to the set heights when the user presses the height keys.

In order to make sure that both legs are synchronously telescoped the second preferred embodiment of the present invention further provides a synchronization module on the motors.

Figure 7:
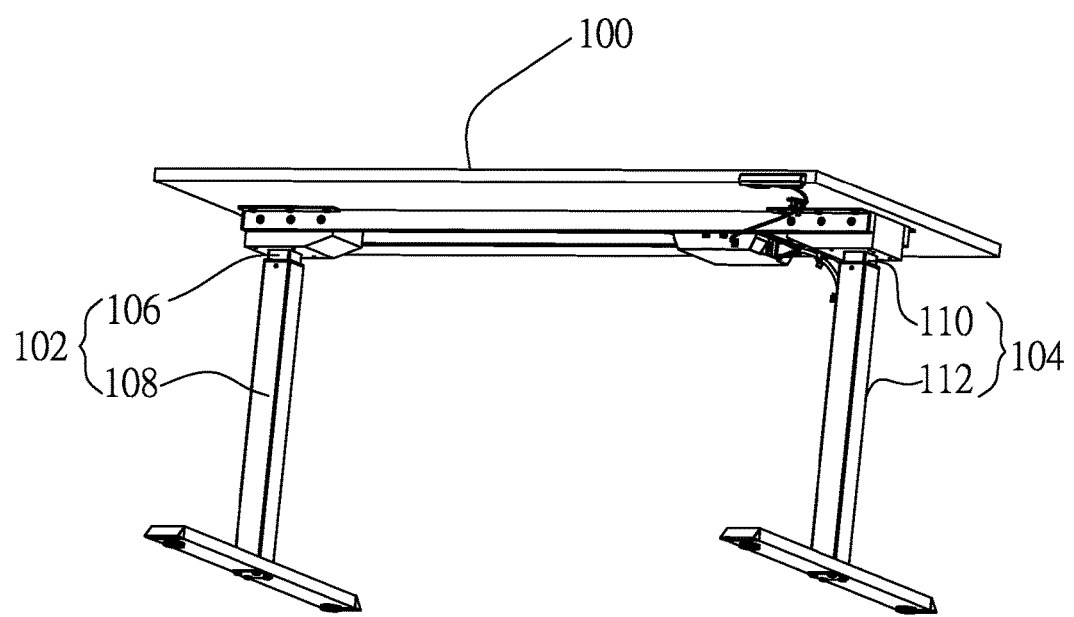
FIG. 7 is a perspective view of a second preferred embodiment of the present invention.

Here we make some definitions for the elements of the height adjustable desk of the second preferred embodiment of the present invention for the following description. As shown in FIG. 7, the height adjustable desk has a worksurface 100, a first leg 102, and a second leg 104, wherein the first and the second legs 102, 104 are connected to a bottom of the worksurface 100. The first leg 102 has an inner tube 106 and an outer tube 108 engaging the inner tube 106, while the second leg 104 has an inner tube 110 and an outer tube 112 engaging the inner tube 110. The first leg 102 is received with a first motor 114 and a first lifting apparatus 116, wherein the first motor 114 drives the first lifting apparatus 116 to telescope the first leg 102. The second leg 104 is received with a second motor 118 and a second lifting apparatus 120, wherein the second motor 118 drives the second lifting apparatus 120 to telescope the second leg 104. The first and the second lifting apparatuses 116 and 120 may be the same as the relative elements as described in the first preferred embodiment, or any lifting apparatus that the person having the ordinary skill in the art may find in the prior art.

Figure 8:
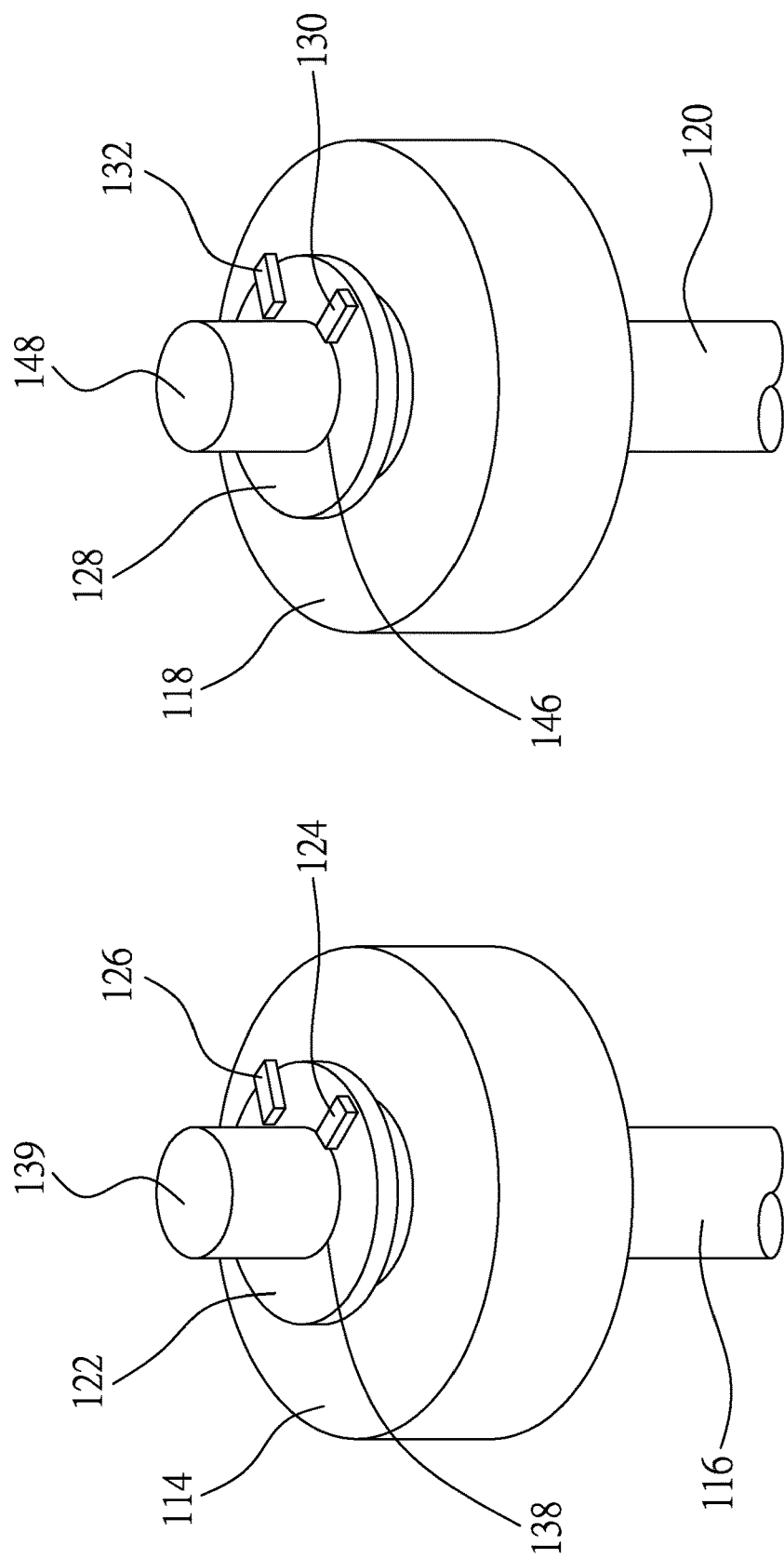
FIG. 8 is a sketch diagram of a second preferred embodiment of the present invention, showing the magnetic devices and the sensors on the motor.
Figure 9:
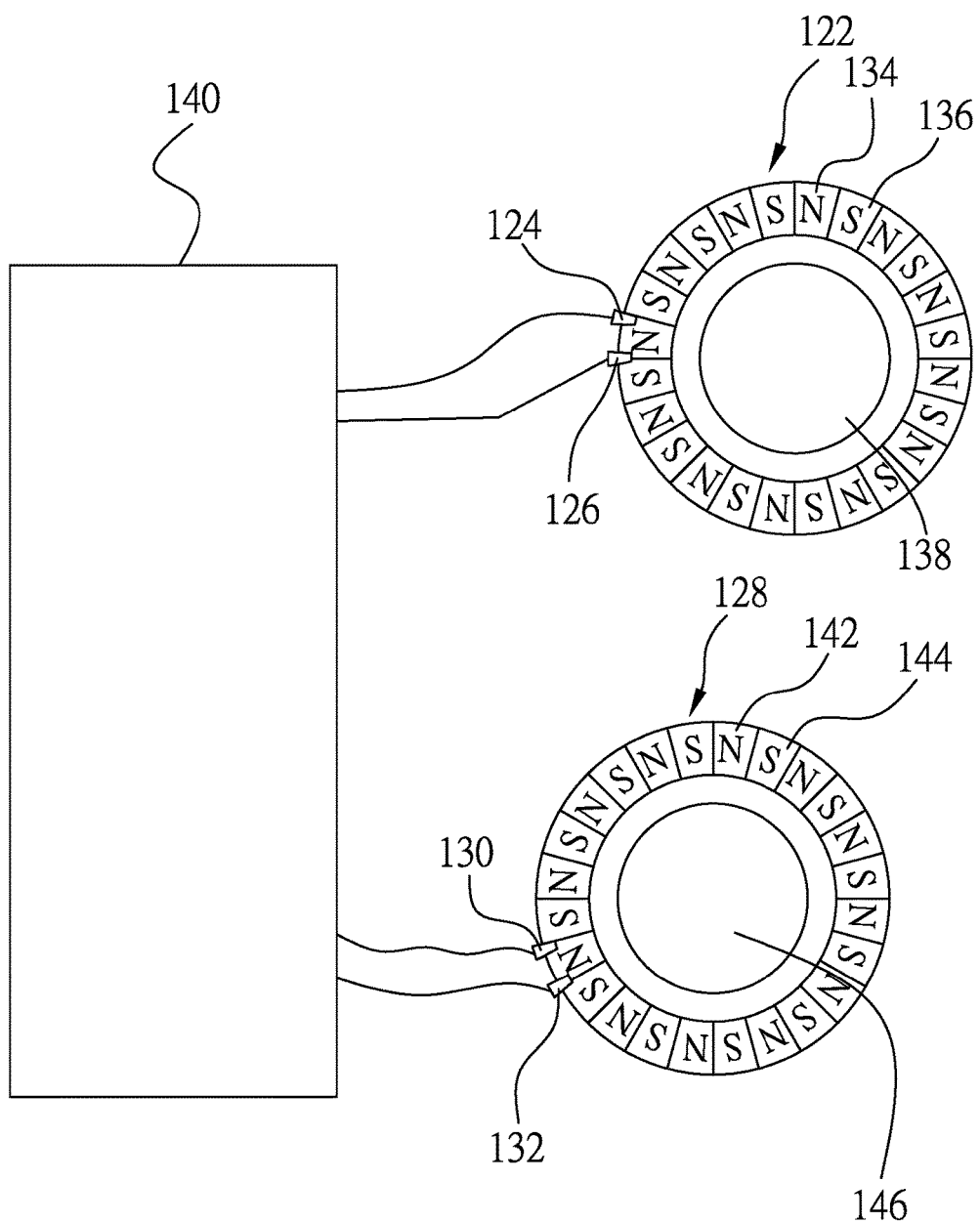
FIG. 9 is a sketch diagram of the second preferred embodiment of the present invention, showing tops of the magnetic devices and the sensors connected to the control unit.

As shown in FIG. 8 and FIG. 9, the second preferred embodiment further provides a first magnetic device 122, a first front sensor 124, and a first rear sensor 126 in the first leg 102, and a second magnetic device 128, a second front sensor 130, and a second sensor 132 in the second leg 104.

The first magnetic device 122 is a disk-like member having a plurality of N-pole sections 134 and a plurality of S-pole sections 136 alternately arranged in an annular pattern. The first magnetic device 122 has a bore 138 at a center thereof to be connected to a shaft 140 of the first motor 114, so that the first magnetic device 122 is turned along with the first motor 114. The first front sensor 124 and the first rear sensor 126 are fixed in the first leg 102 and adjacent to the first magnetic device 122 to detect a change of a magnetic field when the first magnetic device 122 is turning, and send signals to a control unit 140.

Figure 10:
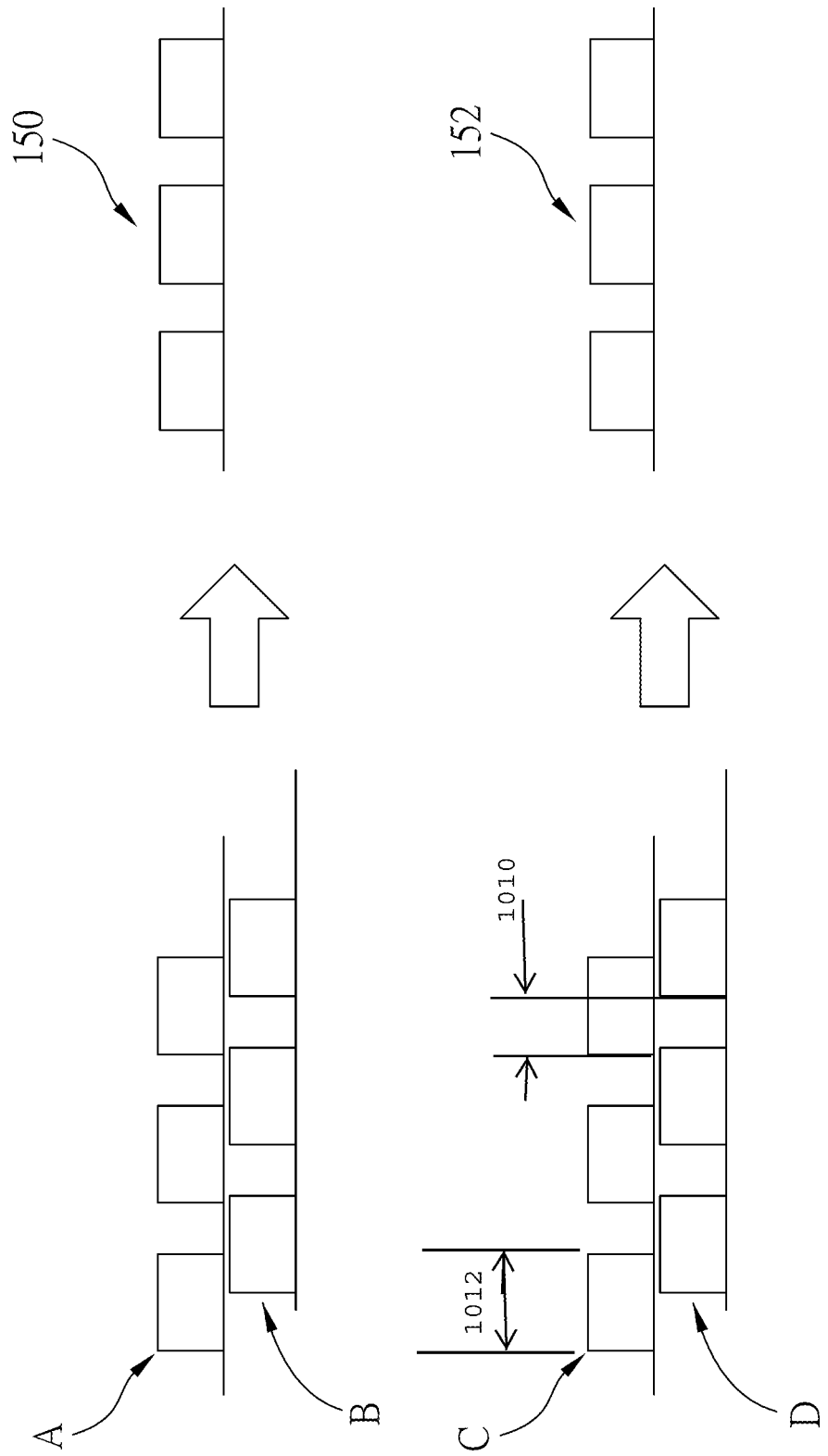
FIG. 10 are oscillograms of the signals of the front and the rear sensors and the combinative signals of the second preferred embodiment of the present invention.

Because of positions of the first front sensor 124 and the first rear sensor 126 relative to the first magnetic device 122, the signals A of the first front sensor 124 and the signals B of the first rear sensor 126 has a phase difference 1010 as shown in FIG. 10. In the present embodiment, the phase difference is in a range between 90 degrees and 150 degrees, and more preferable, the phase difference is 120 degrees. The reasons for we providing two sensors include: 1). it may determine the direction of the turning of the motor, and 2). it may prevent both of the sensors from stopping at the boundaries of the N-pole sections 134 and the S-pole sections 136 which may cause error of detection.

The same as the first magnetic device 122, the second magnetic device 128 is a disk-like member having a plurality of N-pole 142 sections and a plurality of S-pole sections 144 alternately arranged in an annular pattern. The second magnetic device 128 has a bore 146 at a center thereof to be connected to a shaft 148 of the second motor 118, so that the second magnetic device 128 is turned along with the second motor 118. The second front sensor 130 and the second rear sensor 132 are fixed in the second leg 104 and adjacent to the second magnetic device 128 to detect a change of a magnetic field when the second magnetic device 128 is turning, and send signals to the control unit 140. The signals C of the second front sensor 130 and the signals D of the second rear sensor 132 has a phase difference of 120 degrees as well.

Figure 11:
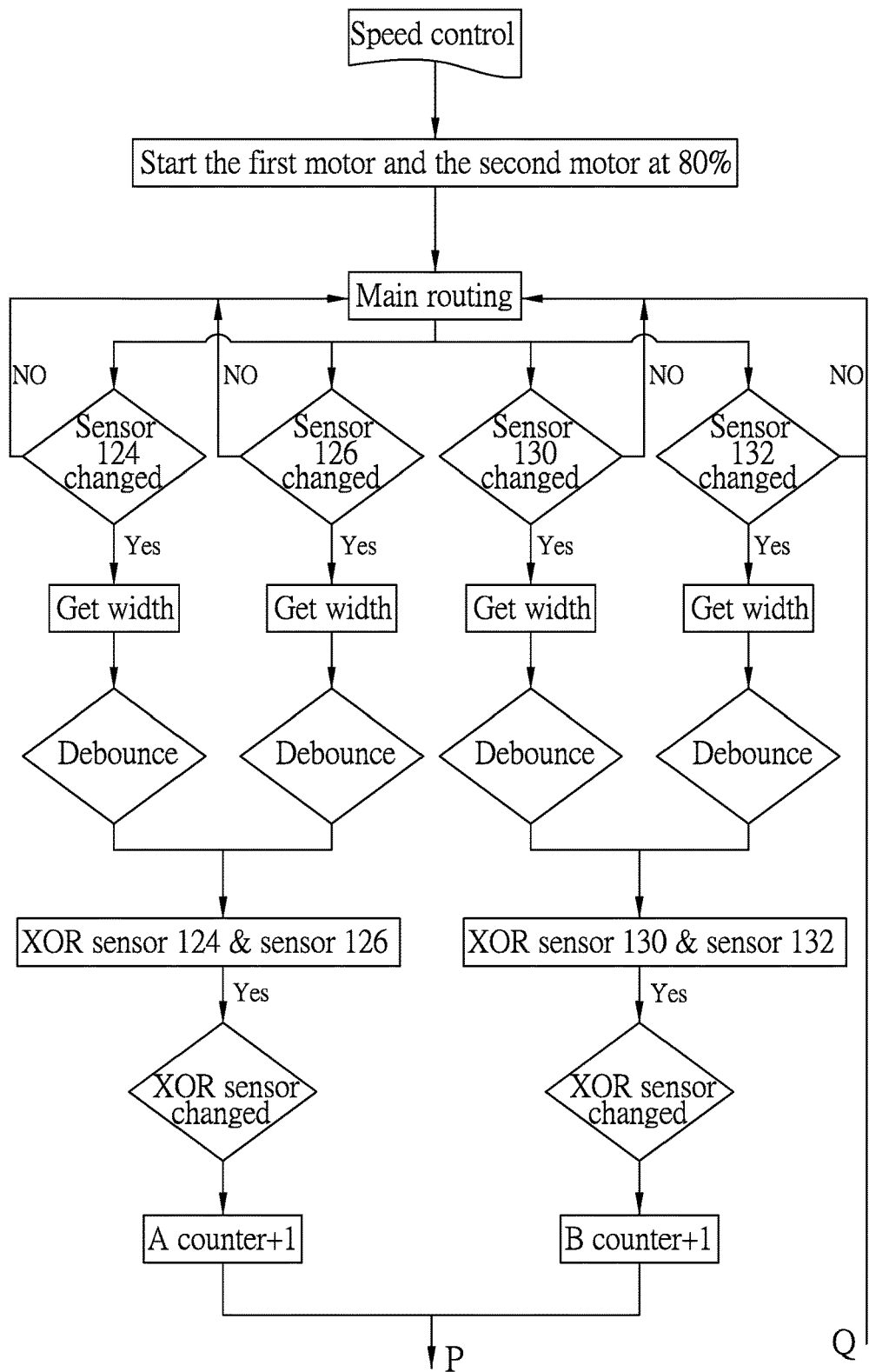
FIG. 11 is a flow chart of the second preferred embodiment of the present invention.
Figure 11:
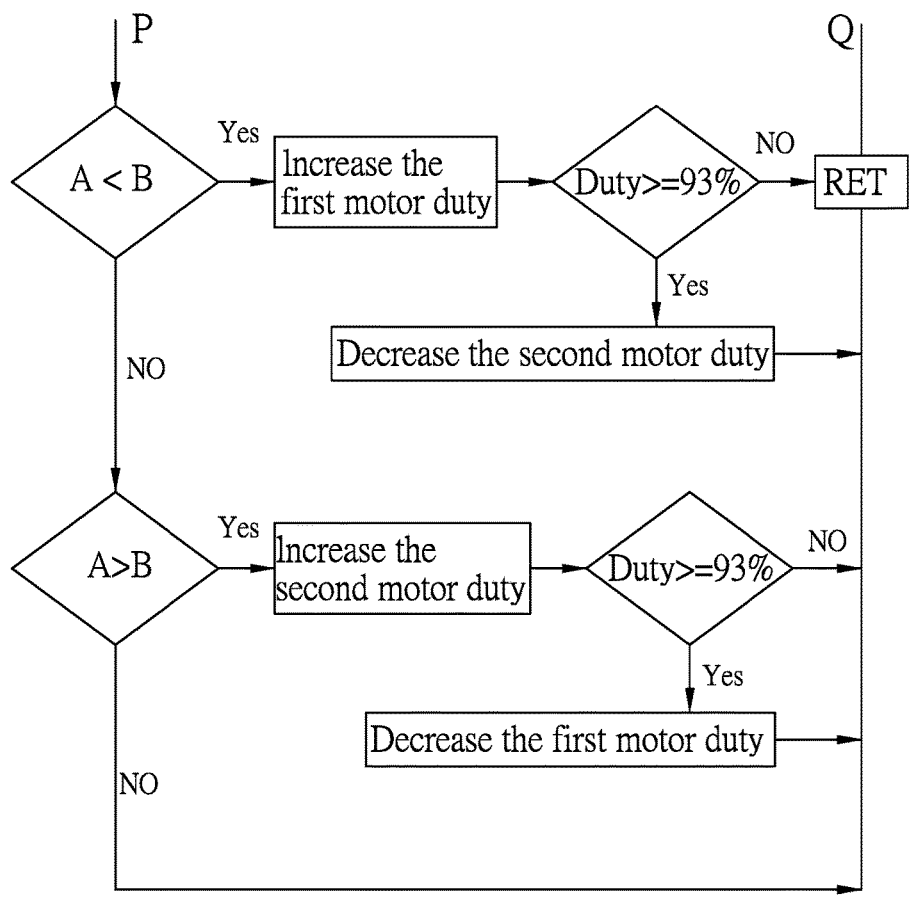

As shown in FIG. 10 and FIG. 11, after the control unit 140 receives the signals from the first front and first rear sensors 124, 126 and the second front and the second rear sensors 130, 132, the control unit 140 will execute a signal analysis, including determining widths 1012 (as shown in FIG. 10) of the signals of the first front and first rear sensors 124, 126 and the second front and the second rear sensors 130, 132, debouncing the signals, combining the signals of the first front and first rear sensors 124, 126 to form first combinative (combined) signals 150 and combining the signals of the second front and second rear sensors 130, 132 to form second combinative signals 152, and determining widths of the first combinative signals 150 and the second combinative signals 152 by an exclusive OR (XOR) logical operation.

Next, the control unit 140 will keep monitoring the first combinative signals 150 and the second combinative signals 152 to find out whether they are synchronous. If the first combinative signals 150 and the second combinative signals 152 are synchronous, it indicates that the first motor 114 and the second motor 18 are turning in the same speed. A way of determining that the first combinative signals 150 and the second combinative signals 152 are synchronous or not is counting a number of the first combinative signals 150 and a number of the second combinative signals 152 respectively, and determining the first combinative signals 150 and the second combinative signals 152 are not synchronous when the number of the first combinative signals 150 is not equal to the number of the second combinative signals 152 at any time. If the number of the first combinative signals 150 is smaller than the number of the second combinative signals 152, it indicates that the second motor 118 is turning faster than the first motor 114, the control unit 140 will increase a power supplied to the first motor 114 to speed up the first motor 114 until the number of the first combinative signals 150 is equal to the number of the second combinative signals 152.

However, if the power supplied to the first motor 114 reaches a maximum operative power and the number of the first combinative signals 150 is not equal to the number of the second combinative signals 152 yet, the control unit keeps providing the maximum operative power to the first motor 114, and decreases a power provided to the second motor 118 until the number of the first combinative signals 150 is equal to the number of the second combinative signals 152.

For example, the first motor 114 and the second motor 118 are provided with 80% of motor duty initially. When the first motor 114 is found that it is slower than the second motor 118, control unit 140 increases the motor duty of the first motor 114. When it reaches 93% of motor duty and the numbers of the first and the second combinative signals 150, 152 still are not the same, the control unit 140 decreases the motor duty of the second motor 118 instead.

If the number of the first combinative signals 150 is greater than the number of the second combinative signals 152, it indicates that the first motor 114 is turning faster than the second motor 118, the adjustment of the power supplied to the second motor 118 and the first motor 114 is the same as above, so we do not describe it again.

It must be pointed out that the embodiments described above are only some preferred embodiments of the present invention. All equivalent structures which employ the concepts disclosed in this specification and the appended claims should fall within the scope of the present invention.

What is claimed is:

1. A height adjustable desk, comprising:
a worksurface;
a first leg and a second leg connected to a bottom of the worksurface;
a first motor and a first lifting apparatus provided in the first leg, wherein the first motor drives the first lifting apparatus to telescope the first leg;

a second motor and a second lifting apparatus provided in the second leg, wherein the second motor drives the second lifting apparatus to telescope the second leg;

a first magnetic device connected to a shaft of the first motor to be turned with the first motor, wherein the first magnetic device has a plurality of N-pole sections and a plurality of S-pole sections alternately arranged in an annular pattern around a first bore;

a first front sensor and a first rear sensor provided in the first leg and adjacent to the first magnetic device to detect a change of a magnetic field when the first magnetic device is turning;

a second magnetic device connected to a shaft of the second motor to be turned with the second motor, wherein the second magnetic device has a plurality of N-pole sections and a plurality of S-pole sections alternately arranged in an annular pattern around a second bore;

a second front sensor and a second rear sensor provided in the second leg and adjacent to the second magnetic device to detect a change of a magnetic field when the second magnetic device is turning; and a control unit receiving signals from the first front sensor, the first rear sensor, the second front sensor, and the second rear sensor;

whereby when the signals of the first front sensor and the first rear sensor and the signals of the second front sensor and the second rear sensor are not synchronous, the control unit controls at least one of the first motor and the second motor to change a speed thereof until the signals of the first front sensor and the first rear sensor and the signals of the second front sensor and the second rear sensor are synchronous again.

2. The height adjustable desk of claim 1, wherein there is a phase difference between the signals of the first front sensor and the signals of the first rear sensor.

3. The height adjustable desk of claim 2, wherein the phase difference is in a range between 90 degrees and 150 degrees.

4. The height adjustable desk of claim 1, wherein there is a phase difference between the signals of the second front sensor and the signals of the second rear sensor.

5. The height adjustable desk of claim 4, wherein the phase difference is in a range between 90 degrees and 150 degrees.

6. A method of keeping two motors synchronously turning, comprising the steps of:

A. providing a first magnetic device on a shaft of a first motor and a second magnetic device on a shaft of a second motor, wherein each of the first and the second magnetic device have a plurality of N-pole sections and a plurality of S-pole sections alternately arranged in an annular pattern around a first bore;

B. providing a first front sensor and a first rear sensor, placed adjacent to the first magnetic device, to sense a change of a magnetic field of the first magnetic device when the first motor is turning, and providing a second front sensor and a second rear sensor, placed adjacent to the second magnetic device, to sensing a change of a magnetic field of the second magnetic device when the second motor is turning, wherein there is a phase difference between signals of the first front sensor and the first rear sensor, and there is a phase difference between signals of the second front sensor and the second rear sensor;

C. combining the signals of the first front sensor and the first rear sensor to obtain first combinative signals, and combining the signals of the second front sensor and the second rear sensor to obtain second combinative signals; and D. comparing the first combinative signals with the second combinative signals, and when the first combinative signals and the second combinative signals are not synchronous, changing a speed of at least one of the first motor and of the second motor until the first combinative signals and the second combinative signals are synchronous again.

7. The method of claim 6, wherein the phase difference between the signals of the first front sensor and the first rear sensor is in a range between 90 degrees and 150 degrees.

8. The method of claim 6, wherein the phase difference between the signals of the second front sensor and the second rear sensor is in a range between 90 degrees and 150 degrees.

9. The method of claim 6, wherein before obtaining the first combinative signals and the second combinative signals, the step C further comprises:

determining widths of the signals of the first front sensor, the first rear sensor, the second front sensor, and the second rear sensor; and debouncing the signals of the first front sensor, the first rear sensor, the second front sensor, and the second rear sensor.

10. The method of claim 9, wherein after obtaining the first combinative signals and the second combinative signals, the step C further comprises:

determining widths of the first combinative signals and the second combinative signals by a logical operation of exclusive or (XOR).

11. The method of claim 6, wherein the step D further comprises:

counting a number of the first combinative signals and a number of the second combinative signals respectively; and determining that the first combinative signals and the second combinative signals are not synchronous when the number of the first combinative signals is not equal to the number of the second combinative signals.

12. The method of claim 11, wherein the step D further comprises:

increasing power supplied to the first motor until the number of the first combinative signals is equal to the number of the second combinative signals if the number of the first combinative signals is smaller than the number of the second combinative signals.

13. The method of claim 12, wherein the step D further comprises:

decreasing power supplied to the second motor until the number of the first combinative signals is equal to the number of the second combinative signals until the number of the first combinative signals is equal to the number of the second combinative signals if the power supplied to the first motor reaches a maximum operative power and the number of the first combinative signals is not equal to the number of the second combinative signals yet.

14. The method of claim 11, wherein the step D further comprises:

increasing power supplied to the second motor until the number of the first combinative signals is equal to the number of the second combinative signals if the number of the first combinative signals is greater than the number of the second combinative signals.

15. The method of claim 14, the step D further comprises:
decreasing power supplied to the first motor until the number of the first combinative signals is equal to the number of the second combinative signals if the power supplied to the second motor reaches a maximum operative power and the number of the first combinative signals is not equal to the number of the second combinative signals yet.

\* \* \* \* \*